United States Patent [19]

Lindemer et al.

[11] 4,077,838
[45] Mar. 7, 1978

[54] PYROLYTIC CARBON-COATED NUCLEAR FUEL

[75] Inventors: Terrence B. Lindemer; Ernest L. Long, Jr., both of Oak Ridge, Tenn.; Ronald L. Beatty, Wurlingen, Switzerland

[73] Assignee: The United States of America as represented by the United States Department of Energy, Washington, D.C.

[21] Appl. No.: 709,350

[22] Filed: Jul. 28, 1976
(Under 37 CFR 1.47)

[51] Int. Cl.² ............................................. G21B 3/02
[52] U.S. Cl. ............................... 176/68; 252/301.1 R
[58] Field of Search ............. 176/68, 69, 91 R, 91 SP; 252/301.1 R

[56] References Cited

U.S. PATENT DOCUMENTS

| 3,359,176 | 12/1967 | Antill | 176/91 R |
|---|---|---|---|
| 3,798,123 | 3/1974 | Lindemer | 176/68 X |
| 3,846,154 | 11/1974 | Lefevre | 176/91 R X |
| 3,856,622 | 12/1974 | Pollock et al. | 176/68 |

*Primary Examiner*—Peter A. Nelson
*Attorney, Agent, or Firm*—Dean E. Carlson; David S. Zachry; Irving Barrack

[57] ABSTRACT

An improved nuclear fuel kernel having at least one pyrolytic carbon coating and a silicon carbon layer is provided in which extensive interaction of fission product lanthanides with the silicon carbon layer is avoided by providing sufficient $UO_2$ to maintain the lanthanides as oxides during in-reactor use of said fuel.

14 Claims, No Drawings

PYROLYTIC CARBON-COATED NUCLEAR FUEL

BACKGROUND OF THE INVENTION

The invention described herein was made in the course of, or under, a contract with the United States Energy Research and Development Administration.

This relates to a nuclear fuel composition of a spheroidal oxidecarbide kernel with at least one pyrolytic carbon coating characterized in that it contains sufficient oxide to insure that fission product elements are retained in the oxide kernel as a rare earth oxide at temperatures in the range 1500°–1800° C. up to 75% FIMA.

In another aspect, this invention may be regarded as a method for controlling two modes of failure which can occur in spheroidal particles comprising $UO_2$ and $UC_2$ kernels coated with at least one pyrolytic carbon coating including a SiC coating.

THE FIRST FAILURE MODE: THE AMOEBA EFFECT

The nuclear fuels of concern are spheroidal kernels containing $UO_2$ and $CO_2$ made by well-known sol-gel techniques or spheroidal kernels comprising a dispersion of $UO_2$ and $UC_2$ made by carbonizing a uranium-loaded charge of strong or weak acid particles.

Oxide nuclear fuels release elemental oxygen during burn-up. In the case of oxide kernels coated with pyrolytic carbon, the oxygen will combine at elevated temperatures with the carbon coating to form CO and $CO_2$. Since the coating is impervious to CO and $CO_2$, extremely high gas pressure up to 1000 atmopsheres can be generated in coated particles after burn-up. This pressure, in turn, then apparently contributes significantly to the migration of the fuel kernel through the carbon or carbide coating, thus destroying the coating and causing unacceptable release of fission products.

A more specific description of such fuels as well as a method for dealing with the first failure mode, known as the amoeba effect, is described in U.S. Pat. No. 3,798,123, the disclosure of which is hereby incorporated by reference.

In the past, fuels for nuclear reactors, particularly high temperature gas-cooled reactors, have comprised fissile uranium or plutonium as an oxide or carbide in the form of an approximately spherical kernel (1). The kernel may also be formed of a solid solution such as $(U, Pu)C_2$ or $(U,Pu)O_2$. This kernel sometimes is additionally comprised of a fertile material, e.g., $Th^{232}$ or $U^{238}$, which is in the same chemical form as the fissile material. The fuel kernel is also provided with several layers of protective coatings to contain fission products and to protect the fuel kernel. The kernel along with the coating constitutes a fuel particle. Normally, these coatings will comprise a cover of porous carbon (2), a sealer layer of dense pyrolytic graphite (3), a layer of silicon carbide (4), and a final layer of dense pyrolytic graphite (5). The inner or "buffer" layer of porous graphite (2) with about 10 to 70% porosity absorbs any expansion or swelling of the kernel itself and minimizes damage to the other layers due to fission fragment recoil from the kernel. The adjacent dense graphite layer (3) is applied to isolate the kernel and layer (2) from attack by deleterious gases, such as chlorine, used in depositing the silicon carbide layer (4). The silicon carbide layer (4) gives dimensional stability to the overall fuel particle and provides containment for metallic fission fragments. This layer may be omitted with experimental fuel but is included in all present particles for practical nuclear reactor applications. The final dense pyrolytic graphite layer (5) gives dimensional stability to the overall particle. Layers (3), (4), and (5) serve as pressure vessels for containment of fission gas. The fuel particle is normally approximately spherical or spheroidal with a diameter of about 400 to 1200 microns. The layer of porous carbon (2) is about 25 to 50 microns in thickness. The kernel (1) is about 300 to 1000 microns in diameter. The sealer layer (3) is about 10 microns in thickness and the dense graphite (5) and silicon carbide (4) layers are normally about 50 to 150 microns in thickness, each depending on the particular particle design.

In a high temperature gas-cooled reactor, the fuel particles are bonded together in a graphite matrix in the form of fuel sticks. The fuel sticks are normally cylinders with a length of from one-half to 6 inches and a diameter of about one-half inch. The fuel sticks are loaded into holes in a hexagonal graphite block to form a fuel element. Additional holes in the grahite block serve as passages for a gas coolant and also as a means for introducing control rods into the fuel element.

In using the above-described design, it has been found that such oxide fuels fail during severe operational conditions. The failure rate has been found to increase with both increasing temperature and with increasing burnup, calculated as fissions per initial metal atom (percent FIMA). The physical cause of this fuel failure has been found to be a thinning of the coatings at one side of the kernel. Sometimes the thinning of the coatings at one side of the kernel is accompanied by a thickening of the coatings at the opposite side of the kernel resulting in the migration of the kernel toward the thin side. The ultimate failure of the particle has been found to be caused by a combination of localized thinning of the coatings, fuel migration, and fission gas pressure buildup within the fuel particle. In some instances of fuel failure the kernel will migrate completely through the coatings, and in other instances a thinning of the coatings weakens the pressure vessel and allows the gas pressure to explode the fuel particle. In either event, the overall process that involves a thinning of the coatings and fuel migration, called the amoeba effect is the principal cause of fuel failure. The overall result of fuel failure is the release of fission products into the gas coolant, the formation of hot spots in the fuel element, and degradation of adjacent particles by the released kernel.

According to the invention of U.S. Pat. No. 3,798,123, it was found that the thinning of the coatings is proportional to the total carbon monoxide and carbon dioxide partial pressures within the fuel particle, the temperature difference across the particle and the percent burnup. The carbon monoxide and carbon dixoide gases area created by a reaction of oxygen, released from the fuel oxide as a consequence of nuclear burnup, with the carbon coatings. The total cabon monoxide and carbon dioxide pressure within a fuel particle is known to reach values as high as about 600 atmospheres at a temperature of 2250 Kelvin (1977° C). While the original fuel particle will withstand such pressures, the thinning of the coatings causes the pressure vesels to weaken and thus fail.

A temperature difference across the fuel particle is an additional factor which enhances the thinning of the coatings, fuel migration and the eventual failure of the particle. This is caused by the temperature difference creating a difference in oxygen potential from one side of the kernel to the other. This difference in oxygen potential causes the $CO_2$ to be reduced by the carbon buffer layer at the hot side while the reverse reaction occurs at the cold side. The reaction at the hot side is $$CO_2 + C \rightarrow 2CO$$

and at the cold side $$2CO \rightarrow CO_2 + C.$$

The net effect of these reactions is that carbon is removed from the hot side and deposited at the cold side. If the deposition at the cold side results in a thickening of the coating and not a densification of the porous buffer layer, the appearance is given that the fuel kernel is migrating toward the hot side. This phenomenon is known as fuel migration.

It was further found that if the total carbon monoxide and carbon dioxide partial pressure is maintained below $10^{(6.8-13,300/T\ K.)}$ atmospheres at temperatures above 1350 K. carbon transport and coating thinning will be minimized to the extent that coating thinning will not be a significant cause of fuel failure. It has been further found that the total carbon monoxide and carbon dioxide partial pressure can be maintained within the temperature and pressure limits given above by establishing a thermodynamic equilibrium between carbon, a metal oxide, and a metal carbide within a fuel particle. Typical equilibrium reactions include the following:

$$MO_2 + 3C \rightleftarrows MC + 2CO \quad \text{(A)}$$

$$MO_2 + 4C \rightleftarrows MC_2 + 2CO, \text{ and} \quad \text{(B)}$$

$$CO_2 + C \rightleftarrows 2CO \quad \text{(C)}$$

with the equilibrium constant for each reaction being $$k_A = \frac{a_{MC} P^2_{CO}}{a_{MO_2} a^3_C}$$

$$k_B = \frac{a_{MC_2} P^2_{CO}}{a_{MO_2} a^4_C}$$

$$k_C = \frac{P^2_{CO}}{a_c P_{CO_2}}$$

where:
M is a metal element,
$k_A$, $k_B$, and $k_C$ are, respectively, the equilibrium constants for reactions A, B, and C,
$a$ is the activity of the indicated subscript compound, and $P_{CO}$ and $P_{CO_2}$ are, respectively, the partial pressures of carbon monoxide and carbon dioxide.

Since the activity of a condensed phase is essentially unity $$k_A \text{ and } k_B + P^2CO$$

and $$k_C = \frac{P^2CO}{P_{CO_2}},$$

it can be seen that by providing a suitable metal (M) to establish the above equilibria, a desired total pressure of carbon monoxide and carbon dioxide may be achieved. For the requirements of this invention the metal (M) in reactions A and B must have a carbide and oxide which have melting points above the operating temperature of the fuel particle, will provide a total carbon monoxide and carbon dioxide partial pressure of less than $10^{(6.8-13,300/T\ K.)}$ atmospheres at temperatures above 1350 K. in accordance with reactions A and B and does not act as a neutron poison. Metals which satisfy the above criterion include uranium, thorium, and plutonium. The optimum proposed operating temperature for a gas-cooled reactor is about 2000° C. The above metal oxides and carbides satisfy this operating temperature requirement.

FIG. 2 of the drawings in U.S. Pat. No. 3,798,123 graphically illustrates the total partial pressure of carbon monoxide and carbon dioxide which must exist as a function of reciprocal temperature in order to fuel particles to have a reasonable operational lifetime. Line D of FIG. 2 represents the maximum permissible total carbon monoxide and carbon dioxide pressure within the operational temperatures of a gas-cooled reactor which can exist in order for the fuel to have an expected lifetime of 1000 to 4000 days. This broad range of lifetimes is given because the lifetime of a fuel will also depend on the level of operation (percent FIMA). Line D is represented by the equation $$P_{CO} + P_{CO_2} = 10^{(6.8-13,300/T\ K.)}$$

where P is in atmospheres.

In order for the conditions of the invention of U.S. Pat. No. 3,798,123 to exist, the equilibrium partial pressure of carbon monoxide and carbon dioxide established by the metal oxide, metal carbide and carbon system must have a total carbon monoxide and carbon dioxide partial pressure which falls below line D of FIG. 2 of U.S. Pat. No. 3,798,123. Line E represents the total carbon monoxide and carbon dioxide partial pressure established by the uranium oxide, uranium carbide and carbon system and by the plutonium oxide, plutonium carbide and carbon system. Line E is described by the equation $$P_{CO} + P_{CO_2} = 10^{(9.35-20,000/T\ K.)}$$

Line F represents the equilibrium established by the thorium oxide, thorium carbide and carbon system and is described by the equation $$P_{CO} + P_{CO_2} = 10^{(10.178-23,400/T\ K.)}$$

Both lines E and F are considerably below line D within the temperature range of interest making the above systems ideal for preventing thinning of coatings and fuel migration. It is understood that a certain amount of solid solution will form within each phase under operational conditions, thus causing the exact chemical formula for each to deviate from the ideal chemical formula given above. However, this deviation does not significantly effect equilibrium partial pressures of carbon monoxide and carbon dioxide.

It should be noted that the carbon required for the equilibrium reaction is provided by the porous carbon buffer layer, as well as the dense pyrolytic graphite layers. Fertile materials such as uranium-238 and thorium-232 may be mixed with the fissile oxide material of the kernel to serve the dual purpose of breeding a new fuel and establishing a thermodynamic equilibrium. In the case of using the thorium-232 isotope as a fertile material, a mixture of thorium oxide and thorium carbide is added to the fissile oxide part of the kernel. In the case of uranium-238, a mixture of uranium oxide and carbide is added to the fissile oxide of the fuel kernel to establish the thermodynamic equilibrium.

If either uranium oxide or plutonium oxide is used as the fissile material of the kernel, then only the corresponding carbide is added to the kernel to create the desired equilibrium.

It has been found that about 1 wt. percent of carbide needs to be added as a second phase to the oxide kernel for every 10% of anticipated FIMA for urania, every 5% FIMA of plutonia, and every 16% FIMA of the fissionable isotopes resulting from transmutation of thoria. This is necessitated by the fact that release oxygen forms additional CO which drives the reactions A and B back to the left thus consuming both the carbide and the CO, thus controlling the CO pressure at a given value. In systems where two or more fuel oxides are to be added to the fuel kernel, an amount of carbide roughly equal to the sum of the proportionate amounts of carbide required for each fissile oxide is required. In general, a total carbide content of from 0.1 to 20 wt. percent is effective to substantially prevent fuel migration.

A preferred embodiment would comprise a fuel kernel of $UO_2$ with UC, $UC_2$ or U(C,O) added in an amount of from 0.1 to 20 wt. percent. U(C,O) is a solid solution. More exactly the composition is represented by the area enclosed by LMN in FIG. 3 of the drawings of U.S. Pat. No. 3,798,123. This area encloses the limits of weight percent carbide specified above. When in contact with carbon the above mixture produces the following typical equilibrium reactions:

$$UO_2 + 4C \rightleftarrows UC_2 + 2CO$$
$$UO_2 + 3C \rightleftarrows UC_2 + CO_2$$
$$UO_2 + 3C \rightleftarrows UC + 2CO$$

These reactions fix the total carbon monoxide and carbon dioxide partial pressures at the equilibrium values shown by line E of FIG. 2. It does not matter which isotope of uranium is added to the kernel to create the above equilibrium since the thermodynamics of the equilibrium process are independent of the isotopic makeup of the constituents. Either fertile $U^{238}$ or fissile $U^{235}$ may be used to create the equilibrium partial pressures of carbon monoxide and carbon dioxide.

The Second Failure Mode: The Lanthanide Effect

Since the development of the invention described in U.S. Pat. No. 3,798,123, extensive high temperature irradiation of such fuels has shown that in addition to the development of adversely high amoeba rates in $UO_2$-containing coated kernels, $UC_2$-containing coated kernels, regardless of density, liberate rare earth fission products. It was found that at 1250° C., 78% FIMA and a fast fluence of $8 \times 10^{21}$ neutrons/cm² the rare earth fission products migrate to the cold side of the coated particle and chemically attack the LTI or other carbon or SiC coating —the second failure mode.

The present invention is based on the discovery that the two modes of fuel failure can be reduced to a significant degree to allow a fuel charge to operate in a reactor up to 75% FIMA. We have discovered that the second mode of fuel failure can be effectively prevented by providing sufficient oxygen in the fuel to insure the existence of the lanthanide fission products as oxides associated with a $UO_2$ phase. This condition can be reached and maintained by providing a spheroidal pyrolytic carbon coated nuclear fuel composition containing from 25–80% $UC_2$ and the balance as $UO_2$ and preferably where the total carbon monoxide and carbon dioxide partial pressure is maintained below $10^{(6.8-13,300/T\ K.)}$.

Fuels with high $UC_2$ content (up to 100% $UC_2$) have been considered in order to preclude any possibility of fuel migration. However, under irradiation, the high $UC_2$ fuels are found to exhibit extensive lanthanide fission product interaction with the carbon and SiC protective layers surrounding the fuel kernel. In particular, La, Pr, Ce and Nd are found to be directly associated with damaged protions of the fuel particle after irradiation.

Fuel migration within coated particles and lanthanide interactions with the coatings of HTGR-type fuels during irradiation are prevented by providing a proper proportion of oxide and carbide within the kernel of the particle.

The principle fuel of interest for high temperaure gas cooled reactors is a biso- or triso-coated kerel derived from a weak acid resin (WAR). Experience with such a fuel when the kernel contained solely $UO_2$ demonstrated the typical migration of the fuel which has been characteristic of all coated $UO_2$ fuels. In contrast, a kernel wherein all the uranium was present as $UC_2$ did not exhibit this fuel migration. However, a very detrimental lanthnide fission product interaction occurs with both the carbon and the silicon carbide layers surrounding the fuel kernel.

In order to further define kernel compositions useful for HTGR fuels which would be immune to the deleterious fuel migration and lanthanide interactions, a series of fuel particles were prepared with varying mole percentages of $UO_2$ in the kernel: 100, 85, 50, 25, and 0, and the remainder $UC_2$. These fuel particles were irradiated to full burnup in the HIFR and portions were then sectioned for analysis including electron microprobe analyses.

Results for particles of the type previously tested were as follows: the completely $UC_2$ kernel exhibited extensive damage due to lanthanide attack upon the coating layers; the completely $UO_2$ kernel exhibited severe fuel migration but no lanthanide interaction; and the $UO_2$ - 15 mole % $UC_2$ exhibited no severe interactions of any kind. In addition, the 50% $UO_2$ fuel kernel particle exhibited entirely satisfactory performance while the 25 mole % $UO_2$ kernel did exhibit some lanthanide interaction although not to the extent exhibited by 100% $UC_2$.

It thus appears that sufficient oxygen is required such that after full burnup (~75% FIMA) the primary lanthanide fission product elements are present as oxides instead of as carbides. From the investigations we conducted, acceptable initial percentages of $UO_2$ (which provides the oxygen) should be between about 30 and 85 mole %.

A kernel of the desired composition can be fabricated by several routes. In practice, the most practical method is probably the weak acid resin technique. The kernels may also be made by agglomerating $UO_2$ and either $UC_2$ or UC powders and sintering the agglomerate in an atmosphere, e.g., CO, to prevent a significant change in the proportion of the oxide and carbide phases. They may also be made by reacting $UO_2$ microspheres with carbon. Each method would lead to a kernel containing the $UC$-$UC_{0.7}O_{0.3}$ solid solution along with $UO_2$ and $UC_2$; the UC-type phase would subsequently react in-reactor with carbon from the buffer coating to form $UC_2$ in the kernel. Should a plutonia fuel be desired, a slightly lower oxide content could be used if desired as there would be less lanthanides in a plutonia system.

What is claimed is:

1. In a spheroidal nuclear fuel paticle comprising a kernel of a fissile metal carbide and at least one pyrolytic carbon coating and a silicon carbide coating on or adjacent said kernel, the improvement comprising a metal oxide within said kernel at a concentration effective to maintain fission product lanthanides as oxides up to at least 75% FIMA, at a temperature of an operating nuclear reactor containing said particle.

2. The particle of claim 1 in which the kernel is a dispersion of fissile metal carbide and an effective concentration of said metal oxide within a carbon or graphite matrix.

3. The particle of claim 2 in which the metal oxide is $UO_2$.

4. The particle of claim 3 in which the $UO_2$ comprises 30 to 85 mole percent of said kernel.

5. The fuel particlee of claim 2 in which said metal carbide is selected from the group consisting of uranium carbide, thorium carbide and plutonium carbide and the effective concentration of said metal oxide is selected from the group consisting of uranium oxide and plutonium oxide.

6. The fuel particle of claim 4 in which the concentration of said oxide is at a concentration effective to establish a thermodynamic equilibrium with said carbon or graphite to maintain a CO and $CO_2$ particle pressure less than $10^{(6.8-13,300/T\ K.)}$ atmospheres at a temperature above 1350 K.

7. The particle of claim 1 in which the fissile metal carbide is $UC_2$ and said kernel comprises 25–80 mole percent $UC_2$ and the balance $UO_2$.

8. A method of preventing lanthanide fission product interaction with coating materials in a spheroidal nuclear fuel particle comprising a kernel containing a fissile metal carbide and at least one pyrolytic carbon coating and a silicon carbide coating on or adjacent said kernel said method comprising providing sufficient metal oxide within said kernel to maintain fission product lanthanides as oxides up to at least 75% FIMA, at a temperature of an operating nuclear reactor containing said particle.

9. The method of claim 8 in which the metal oxide is $UO_2$.

10. The method of claim 9 in which the fissile metal carbide is $UC_2$ and said $UC_2$ comprises 25–80% of said kernel and the balance $UO_2$.

11. The method of claim 8 in which the kernel is a dispersion of fissile metal carbide and an effective concentration of said metal oxide within a carbon or graphite matrix.

12. The method of claim 11 in which the metal oxide is $UO_2$ and said $UO_2$ comprises 30 to 85 mole percent of said kernel.

13. The method of claim 8 in which said metal carbide is selected from the group consisting of uranium carbide, thorium carbide, and plutonium carbide, and the effective concentration of said metal oxide is selected from the group consisting of uranium oxide and plutonium oxide.

14. The method of claim 11 in which the concentration of said oxide is at concentration effective to establish a thermodynamic equilibrium with said carbon or graphite to maintain a CO and $CO_2$ particle pressures less than $10^{(6.8-13,300/T^\circ\ K.)}$ atmospheres at a temperature above 1350 K.

* * * * *